US010486243B2

(12) United States Patent
Cavezzale (10) Patent No.: US 10,486,243 B2
(45) Date of Patent: Nov. 26, 2019

(54) MACHINING CENTERS FOR METAL PROFILES

(71) Applicant: Mecal S.r.l., Frascarolo (IT)

(72) Inventor: Ennio Cavezzale, Frascarolo (IT)

(73) Assignee: MECAL S.R.L. (IT)

( * ) Notice: Subject to any disclaimer, the term of this patent is extended or adjusted under 35 U.S.C. 154(b) by 0 days.

(21) Appl. No.: 15/659,132

(22) Filed: Jul. 25, 2017

(65) Prior Publication Data

US 2018/0029143 A1 Feb. 1, 2018

(30) Foreign Application Priority Data

Jul. 28, 2016 (IT) .................. 102016000079534

(51) Int. Cl.
| | |
|---|---|
| *B23Q 1/01* | (2006.01) |
| *B23C 3/02* | (2006.01) |
| *B23C 1/08* | (2006.01) |
| *B23C 3/00* | (2006.01) |
| *B23C 1/00* | (2006.01) |
| *B23Q 39/02* | (2006.01) |
| *B23Q 39/00* | (2006.01) |

(52) U.S. Cl.
CPC .............. *B23C 3/002* (2013.01); *B23C 1/002* (2013.01); *B23C 1/08* (2013.01); *B23Q 1/012* (2013.01);
(Continued)

(58) Field of Classification Search
CPC ............. Y10T 29/5105; Y10T 29/5107; Y10T 409/307168; Y10T 409/307728;
(Continued)

(56) References Cited

U.S. PATENT DOCUMENTS 3,000,674 A * 9/1961 Ford ..................... B23Q 1/26
384/44
3,606,033 A * 9/1971 Barilla ............... B23K 37/0452
414/777
(Continued)

FOREIGN PATENT DOCUMENTS

EP 0507033 A1 10/1992
EP 1134055 A 9/2001
(Continued)

OTHER PUBLICATIONS

Italian Search Report dated Apr. 13, 2017, in corresponding Italian Application No. IT 102016000079534, 8 pages.

*Primary Examiner* — Sunil K Singh
*Assistant Examiner* — Michael Vitale
(74) *Attorney, Agent, or Firm* — MH2 Technology Law Group, LLP (57) ABSTRACT

A machining center for machining profiles may include: a base having a longitudinal axis, the base defining a work surface extending with first and second ends along the longitudinal axis, wherein the base is configured to receive a profile manually laid along the longitudinal axis of the base by an operator or by a specially-designed automatic feeder; a plurality of support and lock members for supporting and locking the profile on the base, wherein each of the support and lock members can be placed on respective profiled guides which extend parallel to the longitudinal extent of the base between the first and second ends, and wherein each of the support and lock members is displaceable independently along the longitudinal extent of the base; a pair of vertical columns, each of the columns supporting at least one first motorized spindle; and/or a portal structure, comprising an upper beam, above the base.

18 Claims, 5 Drawing Sheets

(52) U.S. Cl.
CPC ........ *B23Q 39/026* (2013.01); *B23C 2222/04* (2013.01); *B23C 2270/08* (2013.01); *B23Q 2039/006* (2013.01); *Y10T 29/5105* (2015.01); *Y10T 409/307168* (2015.01); *Y10T 409/307728* (2015.01); *Y10T 409/307784* (2015.01); *Y10T 409/308288* (2015.01); *Y10T 409/308344* (2015.01); *Y10T 409/309632* (2015.01)

(58) Field of Classification Search
CPC . Y10T 409/307784; Y10T 409/308288; Y10T 409/308344; Y10T 409/308568; Y10T 409/309576; Y10T 409/309632; B23Q 1/012; B23Q 7/042; B23Q 2039/002; B23Q 2039/006; B23C 1/04; B23C 1/08; B23C 1/10
USPC ....... 29/26 A, 26 R; 409/192, 202, 203, 212, 409/213, 217, 235, 236
See application file for complete search history.

(56) References Cited

U.S. PATENT DOCUMENTS

| | | | | |
|---|---|---|---|---|
| 4,728,229 A | * | 3/1988 | Memmel | B23B 39/161 408/46 |
| 5,848,458 A | * | 12/1998 | Bullen | B23P 21/004 29/33 K |
| 5,914,876 A | * | 6/1999 | Hirai | G05B 19/408 700/181 |
| 6,254,317 B1 | * | 7/2001 | Chang | B23B 39/006 408/1 R |
| 6,634,072 B2 | * | 10/2003 | Ohmori | B23Q 7/02 269/20 |
| 7,448,120 B2 | * | 11/2008 | Ohmori | B23C 3/002 269/258 |
| 2008/0254959 A1 | * | 10/2008 | Takayama | B23Q 1/5412 483/32 |
| 2012/0205360 A1 | * | 8/2012 | Fitzpatrick | B23B 41/003 219/137 R |
| 2013/0047390 A1 | * | 2/2013 | Ongaro | B23Q 39/026 29/27 C |
| 2013/0160514 A1 | * | 6/2013 | Mitze | B21D 3/10 72/224 |

FOREIGN PATENT DOCUMENTS

| | | |
|---|---|---|
| EP | 2246150 A | 11/2010 |
| EP | 2862671 A | 4/2015 |
| GB | 2156712 A | 10/1985 |
| JP | S5228791 A | 3/1977 |
| WO | 01/17718 A1 | 3/2001 |

\* cited by examiner

MACHINING CENTERS FOR METAL PROFILES

CROSS-REFERENCE TO RELATED APPLICATION(S)

This application claims priority under 35 U.S.C. § 119 from Italian Patent Application No. 102016000079534, filed on Jul. 28, 2016, in the Italian Patent and Trademark Office ("IPTO"), the entire contents of which are incorporated herein by reference.

FIELD OF THE INVENTION

The present invention relates to a machining center for performing a plurality of machining operations, such as drilling, milling, cutting, using rotating tools, on metal profiles particularly but not exclusively made of aluminum.

The profiles addressed by the present invention have variable lengths which may exceed several meters and cross sections with variously shaped exterior profiles, possibly having cavities axially extending throughout the length of the profile or for a part of it.

The profiles to be machined are designed for various uses, including the formation of modules for continuous facades of buildings and, more generally, for use in architecture and industry, e.g. in the automotive and/or railroad industries.

DESCRIPTION OF THE PRIOR ART

Depending on the particular use of a given profile, there may be the need, for instance, of making cuts thereon, transverse to its longitudinal axis with a variety of angular inclinations, of forming holes of various diameters, penetrating the faces of the cross section and located along the longitudinal extent of the profile, arranged in groups or spaced from each other, as well as in the peripheral contour of one profile section, as well as milling grooves of various lengths and in positions arranged along the longitudinal and transverse contour of the profile.

These types of machining operations, that have been mentioned by way of example and without excluding other operations of different nature, require the use of special tools, the possibility of quickly, possibly automatically changing them, by picking them up from a specially designed tool dispenser, and a motorization which both imparts them the working movement and causes them to assume the required position and inclination relative to the profile to be machined as expected.

The aforementioned machining operations are known to be carried out using electronically controlled machine tools having automatic mechanisms for changing the tools and positioning them relative to the workpiece or profile to be machined.

The operations are also performed by special electronic programs managed by a control unit (CPU), which is designed to actuate the various spindles, to change their position relative to the profile, and to change tools by picking them up from a specially designed magazine, also provided on the machine.

In particular, the machine tools designed to perform multiple machining operations are more precisely called machining centers.

In the prior art, these profile machining centers, for profiles made of metal or other materials, e.g. plastic, or generally for bodies having a longitudinal extent greater than their cross-section dimension, comprise a longitudinally extending work surface, typically referenced as axis X, upon which the profile is manually laid by an operator or by a specially-designed automatic feeder, lock members for locking the profile on said work surface, vertical columns, typically referenced as axis Z, for supporting motorized tools, the columns being located next to said work surface, and being configured to being displaced in either direction along the axis X, parallel to the longitudinal extent of the support surface, each vertical column being equipped with a first carriage configured to vertically sliding, i.e. along the axis Z, in either direction along its respective column and with a second carriage mounted to the first carriage, and configured to sliding in either direction along an axis, referenced as axis Y, perpendicular to its respective column, a beam being fixed to the second carriage of each column, said beam extending in cantilever fashion along the aforementioned axis Y, perpendicular to the longitudinal extent (axis X) of the work surface, and carrying at least one motorized assembly of tools, motor means being provided for imparting movements to the columns and their carriages.

One example of a profile machining center of the aforementioned type is described and shown in EP-A-2,862,671, a second example thereof is described and shown in EP-A-2,246,150.

Also, in the prior art, in addition to a work surface extending longitudinally (axis X), upon which the profile is laid manually by an operator or by a specially-designed automatic feeder, and in addition to the lock members for locking the profile on said work surface, a machining center for mainly longitudinally extending workpieces, such as aluminum or plastic profiles comprises a portal structure whose upper beam located above (axis Y) the work surface is equipped with rotating tools mounted to respective carriages that are configured to being positioned along axes of a Cartesian coordinate system (X, Y, Z).

One example of a profile machining center of the aforementioned type having a portal, is described and shown in EP-A-1,134,055.

In practical use, difficulties arise in the aforementioned prior art machining centers when machining operations such as drilling, middling and cutting have to be performed on all the sides of the perimeter of an aluminum profile section when this profile has a complex multi-sided section, with sides having very different lengths, and requiring the tool to be positioned with different inclinations and on different planes.

The present invention has the object of providing at machining center for mental metal profiles, particularly made of aluminum, that can perform a wide variety of machine operations on the profile, even those that require a 5-axis tool orientation, some of them being possibly performed at the same time, with no tool hindering the operation of another tool, thereby affording the advantage of high throughput and lower cost of the finished product.

SUMMARY OF THE INVENTION

This and other objects, as better explained hereafter, are fulfilled by a machining center form metal profiles, particularly made of aluminum, as defined in the accompanying claim 1.

DESCRIPTION OF THE FIGURES

The invention will be now described in greater detail with reference to one preferred embodiment thereof, given by way of illustration and without limitation in the annexed drawings, in which.

DETAILED DESCRIPTION OF THE INVENTION

Figure 1:
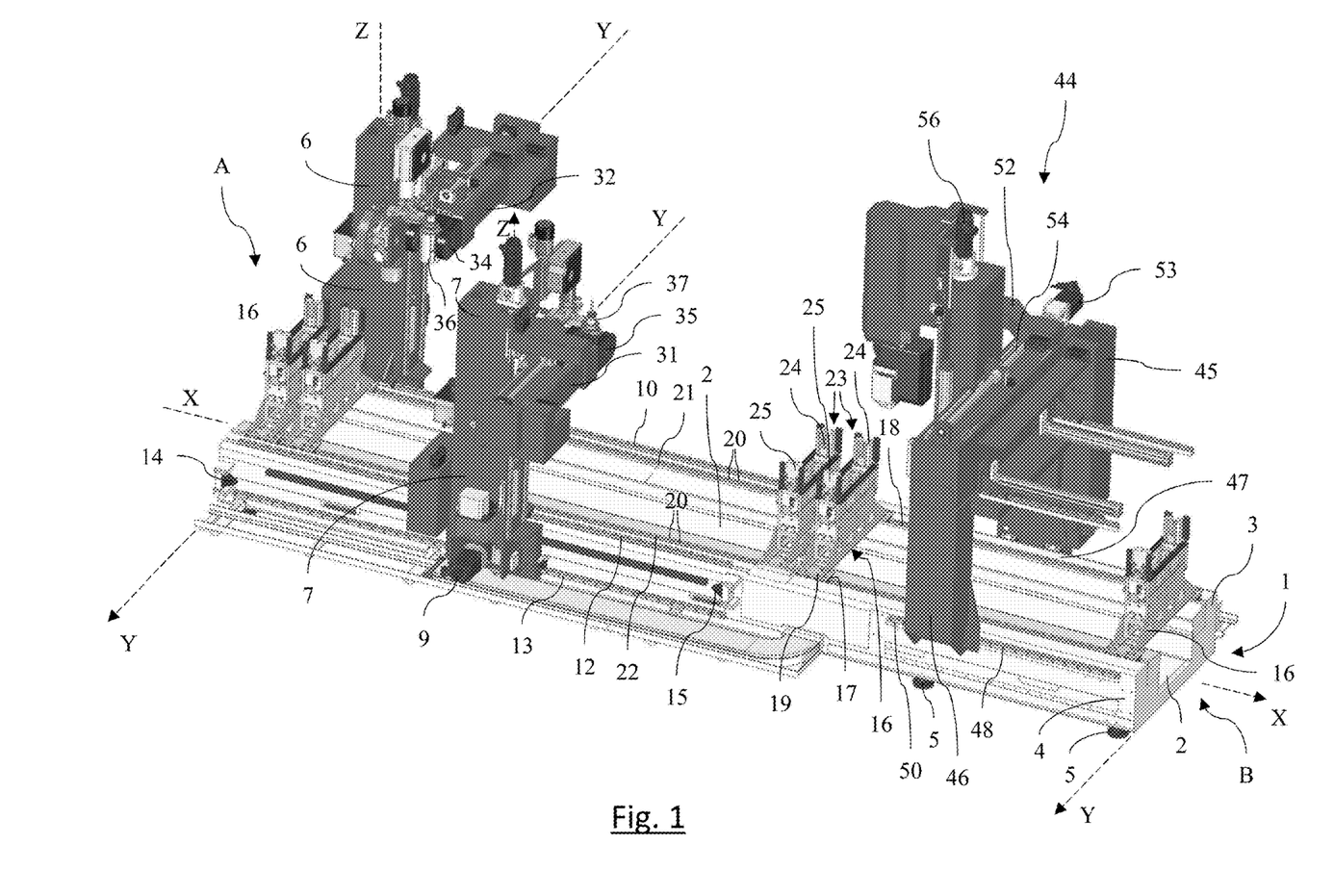
FIG. 1 shows a perspective view of the entire machining center of the invention.

Referring to the above figures and particularly to FIG. 1, the machining center of the present invention comprises a base 1 which extends longitudinally from a first end A to a second end B, along an axis referenced X, and transversely along an axis referenced Y, perpendicular to the axis X.

The base 1, defining a work surface, is composed of a central base area 2 with longitudinal members 3 and 4 adjacent thereto, extending all along the plant and having conventional adjustable ground-contact devices 5.

Columns, generally referenced 6 and 7, are located at the sides of the longitudinal members 3 and 4, proximate to the end A of the base 1, and can slide in either direction along the axis X through specially-designed motorized means comprising respective electric motors 8 and 9 mounted to respective columns, and longitudinal guide and slide racks 10, 11, 12 and 13.

Each column 6 and 7 may be displaced along a predetermined path, between two limit stop positions 14 and 15 and the displacement path of the column 6 may be equal to or different from the one of the column 7.

Thus, the columns 6 and 7 may be displaced independently of each other and stopped at any position of their longitudinal displacement path.

Support and lock members 16 are placed on the base 1 for supporting and locking the profile to be machined, not shown.

These members 16 are mounted to recirculating-ball pads 17 and 18 by anchor screws 19.

Each member 16 is slidingly movable on profiled guides 21 and 22 which extend parallel to the longitudinal members 3 and 4 and are rigidly joined thereto by anchor screws 20.

In order to support the profile on the work surface, each member 16 comprises a vise, generally referenced 23, consisting of the jaws 24 and 25, one of which may be normally fixed and the opposite one may be movable to clamp the profile, not shown, therebetween.

While the profile supporting and locking members 16 are shown in pairs and side by side in FIG. 1, it shall be understood that each of them may be separately positioned along the base 1, with a space therebetween for placement of a work tool either above or below the profile, as better explained hereinafter.

Figure 4:
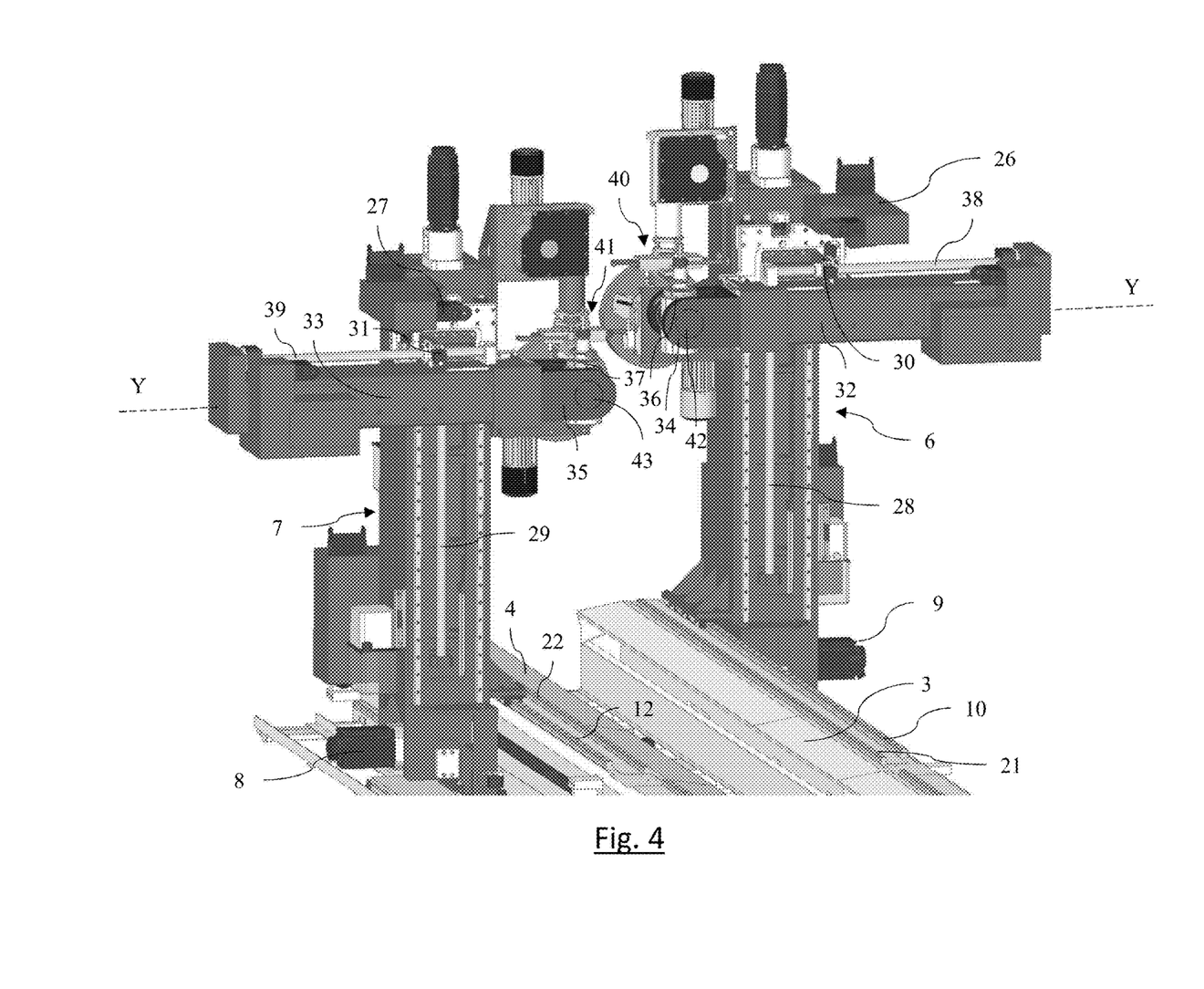
FIG. 4 shows the pair of columns next to the work surface, on a larger scale than in FIG. 1.

Particularly referring to FIG. 4, it can be noted that each column 6 and 7 is equipped with a respective first carriage, 26 and 27 respectively, which can vertically translate along their respective columns, i.e. along a vertical axis Z, through motorized means, e.g. of the nut and worm screw type, like those referenced 28 and 29 in FIG. 4.

Each of said carriages 26 and 27 has second carriages, referenced 30 and 31, mounted thereto, each being equipped with a respective arm 32 and 33 terminating with a respective head 34 and 35, which is rotatably mounted to a pin, not shown, whose axis extends parallel to the axis of translation Y of the respective arm 32 and 33.

Tool spindles 36 and 37 are mounted to said rotating heads 34 and 35.

Figure 5:
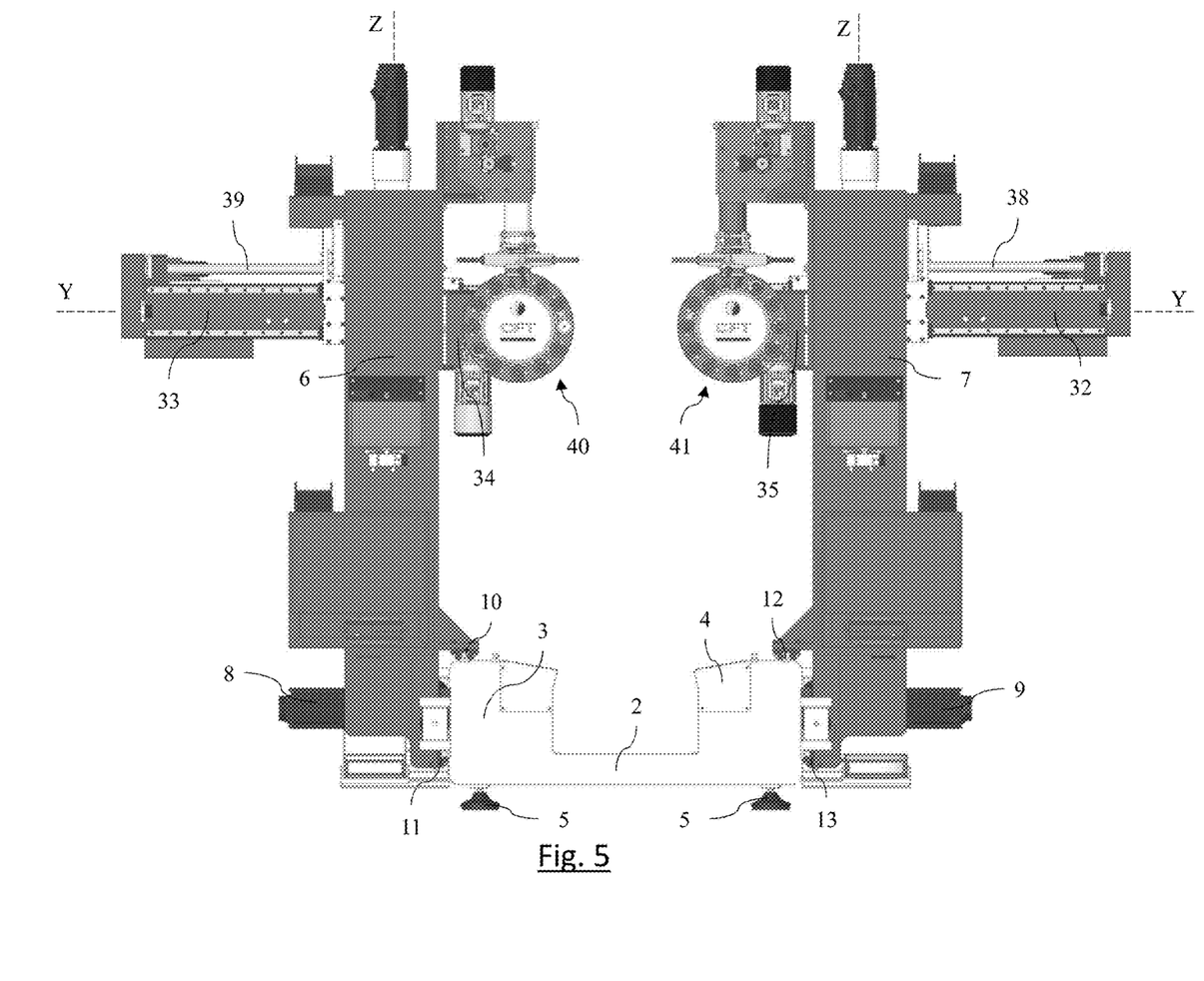
FIG. 5 shows a front view of the pair of columns of FIG. 4, on a larger scale than in FIG. 1.

The carriages 30 and 31, with their arms 32 and 33, can translate horizontally, i.e. along an axis Y, perpendicular to the vertical extent of the columns 6 and 7, through motorized means, e.g. of the type composed of a nut and a worm screw, the latter being reference 38 and 39 in FIGS. 1, 4 and 5.

Conventional tool-changing magazines, generally referenced 40 and 41, are disposed next to each spindle 36, 37.

Each spindle 36 and 37 is mounted to the respective head 34 and 35 between fork elements to be able to be angularly displaced about an axis referenced 42 and 43 respectively.

With the above described column-based structure, it will be appreciated that the tools actuated by the spindles 36 and 37 may be placed, relative to the profile to be machined, which is positioned and locked on the supports 16, in any point of the Cartesian space XYZ, and at any angle about the angular displacement axes 42 and 43, as well as about pins, not shown, about which the heads 34 and 35 are rotatably mounted at the ends of their respective arms.

Figure 2:
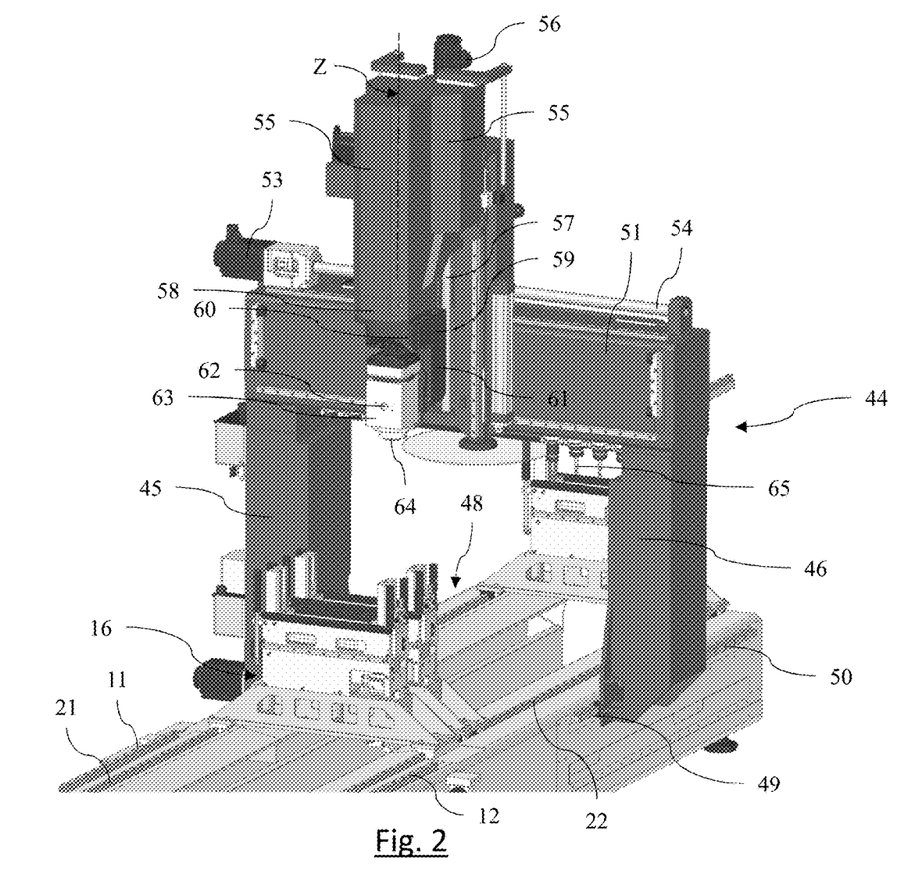
FIG. 2 shows an enlarged perspective view of the portal structure of the machining center of FIG. 1.
Figure 3:
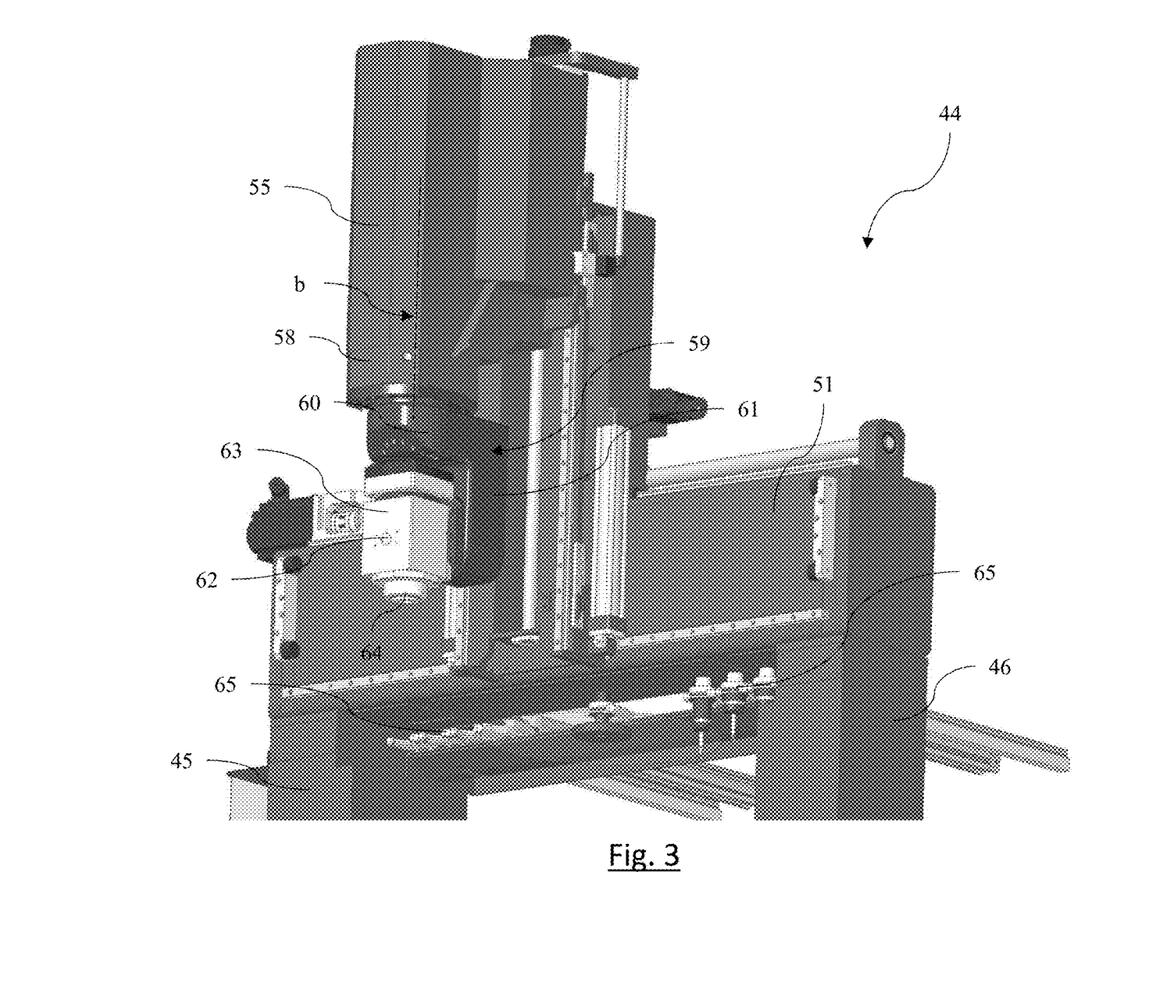
FIG. 3 shows an enlarged perspective view of the upper crossbeam of the portal structure of FIG. 2 and the equipment mounted thereto.

Referring now to FIGS. 1, 2 and 3, it can be noted that the machining center of the invention also comprises a portal structure, generally referenced 44, which is located at the end of the base 1 opposite to the end in which the columns 6 and 7 are located.

Such portal structure comprises the vertical columns 45 and 46, whose bases are connected to the longitudinal members 3 and 4 of the base with the interposition of motor means 47 and 48 and guide means 49, 50 for translation of the structure along the axis X of the base.

The portal structure 44 is completed by the horizontal crossbeam 51, which is rigidly fixed to the top of the columns 45 and 46.

According to the invention, a carriage 52 is mounted to the horizontal crossbeam 51, which extends perpendicular to the longitudinal axis X of the base, thereby defining a displacement direction along the axis Y, and is configured to translate, through motor means 53 and 54, in either direction along the horizontal extent of the crossbeam 51, and of being locked in any desired position.

A structure 55 is connected to the carriage 52 and is configured to translate, through motor means 56 and 57, in either direction along the direction perpendicular to the longitudinal extent of the crossbeam 51 (i.e., a direction that coincides with the machining axis Z).

A bracket 59 is connected to the bottom end 58 of the structure 55, through a pin, not shown, which extends along an axis 'b' parallel to the axis Z along which the structure 55 translates, and comprises a first wall 60 facing the bottom end 58 of the structure 55 and a second wall 61 perpendicular to the first, which has a support body 63 carrying a spindle 64 fixed thereto through a pin 62.

The structure is complemented by a tool magazine, generally referenced 65, for automatic tool change by the spindle 64.

With the above described structure, the spindle 64 may assume positions that are angularly inclined about an axis that coincides with the pin 62 and are at the same time inclined about an axis that coincides with a pin, not shown, which connects the bracket 59 to the end 58 of the structure 55.

The machining center of the invention shall be intended to be equipped with a conventional electronic control station, a CPU (Central Processing Unit), not shown, which may control the displacements of the columns 6 and 7 and the portal structure 44, as well as the actuation of the various spindles, including their angular positioning relative to the profile, and the automatic tool change, depending on the machining program to be executed on the profile.

The invention claimed is:

1. A machining center for machining profiles, the machining center comprising:
   a base having a first longitudinal axis, the base defining a work surface extending longitudinally with a first end and a second end along the first longitudinal axis, wherein the base is configured to receive a profile of the profiles manually laid along the first longitudinal axis of the base by an operator or by a specially-designed automatic feeder, the profile having a length extending along a second longitudinal axis, a width extending along a transversal axis perpendicular to the second longitudinal axis, and a height extending along a vertical axis perpendicular to the second longitudinal axis and the transversal axis, wherein the length is greater than the width, and wherein the length is greater than the height;
   profiled guides which extend parallel to the longitudinal extent of the base between the first and second ends, the profiled guides being located on the base;
   slide guides which extend parallel to the longitudinal extent of the base between the first and second ends, the slide guides being located next to the base and externally to the profiled guides;
   a plurality of support and lock members for supporting and locking the profile on the base, wherein each support and lock member is slidingly movable on the profiled guides between the first and second ends, wherein each support and lock member can be placed on the profiled guides, and wherein each support and lock member is displaceable independently on the profiled guides along the longitudinal extent of the base;
   a pair of vertical columns, each of the pair of vertical columns supporting at least one first motorized spindle; and
   a portal structure, comprising two vertical legs and an upper beam, above the base;
   wherein the profiled guides are defined by first rails on which each support and lock member can slide,
   wherein each of the two vertical legs interfaces with a respective second rail such that the portal structure is displaceable relative to each of the base and the pair of vertical columns,
   wherein the first rails are disposed vertically higher than each of the second rails,
   wherein the plurality of support and lock members are arranged on the profiled guides and are configured for correctly positioning the profile along the first longitudinal axis between the slide guides,
   wherein each of the pair of vertical columns is located next to the base and is configured to be displaced, in either direction, parallel to the longitudinal extent of the base along respective slide guides,
   wherein each of the pair of vertical columns is displaceable independently of the other,
   wherein each of the pair of vertical columns is equipped with a first carriage and a second carriage,
   wherein each of the first carriages is configured to vertically slide reversibly up and down along a vertical axis of a respective column of the pair of vertical columns,
   wherein each of the second carriages is mounted to the first carriage of the respective column of the pair of vertical columns and is configured to reversibly slide back and forth along an axis perpendicular to the vertical axis of the column associated with the respective first carriage,
   wherein an arm is fixed to the second carriage of each column and is movable with the respective second carriage,
   wherein each arm extends in cantilever fashion in a direction perpendicular to the longitudinal extent of the base,
   wherein the at least one first motorized spindle is placed on the arm,
   wherein motor means are provided for imparting movements to the pair of vertical columns and to the first and second carriages,
   wherein the upper beam is equipped with a second motorized spindle for rotating tools,
   wherein the second motorized spindle of the upper beam is mounted to a support body configured to angularly displace the second motorized spindle around a pivot for rotating about a first axis parallel to the longitudinal extent of the base,
   wherein the pivot is supported by a bracket which is in turn configured to angularly move around a second axis extending perpendicular to a plane defined by the first axis and the direction perpendicular to the longitudinal extent of the base,
   wherein the bracket is carried by a structure slidable on respective guides relative to the upper beam of the portal structure along at least two axes, and
   wherein displacement of the bracket in either direction along the longitudinal extent of the base is imparted by displacement of the portal structure relative to the base.

2. The machining center of claim 1, wherein the portal structure is placed at the second end of the base opposite to the first end, and
   wherein the portal structure is configured to be displaced along the longitudinal extent of the base for a predetermined length, sliding reversibly back and forth along the base.

3. The machining center of claim 1, wherein the pair of vertical columns are placed at opposite sides of the base and are configured to be displaced, sliding back and forth along the longitudinal extent of the base, along predetermined extents from the first end to the second end in which the portal structure is located, and ending before a displacement extent length of the portal structure.

4. The machining center of claim 3, wherein the predetermined extents of the pair of vertical columns, parallel to the sides of the base, have different lengths.

5. The machining center of claim 1, wherein displacement extents of the pair of vertical columns and the portal structure are determined by an electronic control program according to the length of the profile to be machined and a type of mechanical machining operation to be carried out.

6. The machining center of claim 1, wherein during vertical displacement of each of the first carriages on the respective column, the upper beam reaches a level below the profile placed on the plurality of support and lock members.

7. The machining center of claim 1, wherein each of the plurality of support and lock members comprises a vise configured to tighten the profile.

8. The machining center of claim 7, wherein each of the vises comprises first and second jaws, and
   wherein at least the first jaw is movable along a transversal axis of the vise, perpendicular to the first longitudinal axis, to and from the second jaw.

9. A machining center for machining profiles, the machining center comprising:
- a base having a first longitudinal axis, the base defining a work surface extending longitudinally with a first end and a second end along the first longitudinal axis, wherein the base is configured to receive a profile of the profiles manually laid along the first longitudinal axis of the base by an operator or by a specially-designed automatic feeder, the profile having a length extending along a second longitudinal axis, a width extending along a transversal axis perpendicular to the second longitudinal axis, and a height extending along a vertical axis perpendicular to the second longitudinal axis and the transversal axis, wherein the length is greater than the width, and wherein the length is greater than the height;
- a plurality of support and lock members for supporting and locking the profile on the base, wherein each support and lock member is slidingly movable along profiled guides extending between the first and second ends, wherein each support and lock member is positionable separately and independently on the profiled guides along the longitudinal axis of the base, each support and lock member is configured to tighten the profile using a vise, wherein each vise comprises a first jaw and a second jaw, and wherein at least the first jaw is movable along an axis perpendicular to the first longitudinal axis to and from the second jaw;
- a pair of vertical columns, each of the pair of vertical columns supporting at least one first motorized spindle; and
- a portal structure, comprising two vertical legs and an upper beam, above the base;
- wherein each of the pair of vertical columns is located next to the base and is configured to be displaced, in either direction, parallel to the longitudinal extent of the base along respective slide guides,
- wherein each of the pair of vertical columns is displaceable independently of the other,
- wherein the slide guides are located next to the base,
- wherein each of the pair of vertical columns is equipped with a first carriage and a second carriage,
- wherein each of the first carriages is configured to vertically slide reversibly up and down along a vertical axis of the respective column of the pair of vertical columns,
- wherein each of the second carriages is mounted to the first carriage of the respective column of the pair of vertical columns and is configured to reversibly slide back and forth along an axis perpendicular to the vertical axis of the column associated with the respective first carriage,
- wherein an arm is fixed to the second carriage of each column and is movable with the respective second carriage,
- wherein each arm extends in cantilever fashion in a direction perpendicular to the longitudinal extent of the base,
- wherein the at least one first motorized spindle is placed on the arm,
- wherein motor means are provided for imparting movements to the pair of vertical columns and to the first and second carriages,
- wherein the upper beam is equipped with a second motorized spindle for rotating tools,
- wherein the second motorized spindle of the upper beam is mounted to a support body configured to angularly displace the second motorized spindle around a pivot for rotating about a first axis parallel to the longitudinal extent of the base,
- wherein the pivot is supported by a bracket which is in turn configured to angularly move around a second axis extending perpendicular to a plane defined by the first axis and the direction perpendicular to the longitudinal extent of the base,
- wherein the bracket is carried by a structure slidable on respective guides relative to the upper beam of the portal structure along at least two axes,
- wherein displacement of the bracket in either direction along the longitudinal extent of the base is imparted by displacement of the portal structure relative to the base,
- wherein the profiled guides are arranged on the base and extend continuously between the first and second ends,
- wherein the profiled guides are defined by first tracks configured slidingly to support the plurality of support and lock members and to allow motion of each support and lock member continuously between the first and second ends,
- wherein each of the two vertical legs interfaces with a respective second track such that the portal structure is displaceable relative to each of the base and the pair of vertical columns, and
- wherein the first tracks are disposed vertically higher than each of the second tracks.

10. The machining center of claim 9, wherein the portal structure is placed at the second end of the base opposite to the first end, and
- wherein the portal structure is configured to be displaced along the longitudinal extent of the base for a predetermined length, sliding reversibly back and forth along the base.

11. The machining center of claim 9, wherein displacement extents of the pair of vertical columns and the portal structure are determined by an electronic control program according to the length of the profile to be machined and a type of mechanical machining operation to be carried out.

12. The machining center of claim 9, wherein during vertical displacement of each of the first carriages on the respective column, the upper beam reaches a level below the profile placed on the plurality of support and lock members.

13. A machining center for machining profiles, the machining center comprising:
- a base having a first longitudinal axis, the base defining a work surface extending longitudinally with a first end and a second end along the first longitudinal axis, wherein the base is configured to receive a profile of the profiles manually laid along the first longitudinal axis of the base by an operator or by a specially-designed automatic feeder, the profile having a length extending along a second longitudinal axis, a width extending along a transversal axis perpendicular to the second longitudinal axis, and a height extending along a vertical axis perpendicular to the second longitudinal axis and the transversal axis, wherein the length is greater than the width, and wherein the length is greater than the height;
- a plurality of support and lock members for supporting and locking the profile on the base, wherein each support and lock member of the plurality of support and lock members is slidingly movable along profiled guides extending between the first and second ends, wherein each support and lock member is positionable separately and independently on the profiled guides along the longitudinal axis of the base;

a pair of vertical columns, each of the pair of vertical columns supporting at least one first motorized spindle; and a portal structure, comprising two vertical legs and an upper beam, above the base;

wherein each of the pair of vertical columns is located next to the base and is configured to be displaced back and forth along a direction parallel to the first longitudinal axis along respective slide guides extending along the longitudinal extent of the base, wherein each of the pair of vertical columns is displaceable independently of the other, wherein the slide guides are located next to the base, wherein each of the pair of vertical columns is equipped with a first carriage and a second carriage, wherein each of the first carriages is configured to vertically slide reversibly up and down along a vertical axis of the respective column of the pair of vertical columns, wherein each of the second carriages is mounted to the first carriage of the respective column of the pair of vertical columns and is configured to reversibly slide back and forth along a first axis parallel to the transversal axis, and perpendicular to the vertical axis and to the longitudinal axis, wherein an arm is fixed to the second carriage of each of the pair of vertical columns and is movable with the respective second carriage, wherein each arm terminates with a head which is rotatable about a second axis parallel to the transversal axis, wherein each arm extends in cantilever fashion in a direction perpendicular to the longitudinal extent of the base, wherein the at least one first motorized spindle is placed on the arm, wherein motor means are provided for imparting movements to the pair of vertical columns and to the first and second carriages, wherein each at least one first spindle is movable along the longitudinal axis, the vertical axis, and the transversal axis, and is rotatable about a third axis parallel to the transversal axis, wherein the upper beam is equipped with a second motorized spindle for rotating tools, wherein the second motorized spindle of the upper beam is mounted to a support body configured to angularly displace the second motorized spindle around a pivot for rotating about a first axis parallel to the longitudinal extent of the base, wherein the pivot is supported by a bracket which is in turn configured to angularly move around a second axis extending perpendicular to a plane defined by the first axis parallel to the longitudinal extent of the base and the direction perpendicular to the longitudinal extent of the base, wherein the bracket is carried by a structure slidable on respective guides relative to the upper beam of the portal structure along at least two axes, wherein displacement of the bracket in either direction along the longitudinal extent of the base is imparted by displacement of the portal structure relative to the base, wherein the profiled guides are arranged on the base and extend continuously between the first and second ends, wherein the profiled guides comprise first rails for the plurality of support and lock members, the first rails being configured to allow motion of each support and lock member continuously between the first and second ends, wherein the support and lock members are configured to slide on the first rails to move the profile, wherein each of the two vertical legs interfaces with a respective second rail such that the portal structure is displaceable relative to each of the base and the pair of vertical columns, and wherein the first rails are disposed vertically higher than each of the second rails.

14. The machining center of claim 13, wherein each support and lock member of the plurality of support and lock members comprises a vise configured to tighten the profile.

15. The machining center of claim 14, wherein each of the vises comprises first and second jaws, and wherein at least the first jaw is movable along a transversal axis of the vise, perpendicular to the first longitudinal axis, to and from the second jaw.

16. The machining center of claim 13, wherein the portal structure is placed at the second end of the base opposite to the first end, and wherein the portal structure is configured to be displaced along the longitudinal extent of the base for a predetermined length, sliding reversibly back and forth along the base.

17. The machining center of claim 13, wherein displacement extents of the pair of vertical columns and the portal structure are determined by an electronic control program according to the length of the profile to be machined and a type of mechanical machining operation to be carried out.

18. The machining center of claim 13, wherein during vertical displacement of each of the first carriages on the respective column, the upper beam reaches a level below the profile placed on the plurality of support and lock members.

* * * * *